Patented Dec. 20, 1938

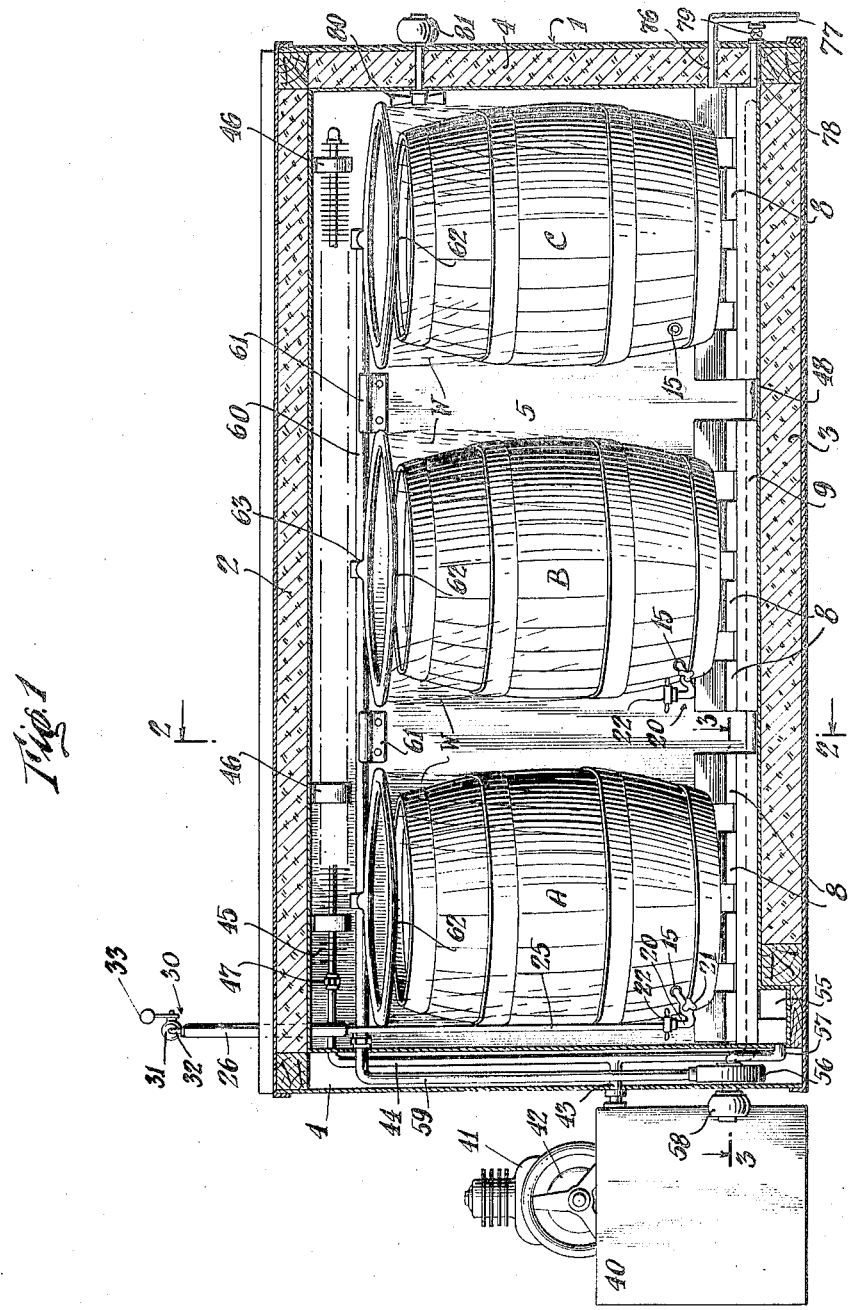

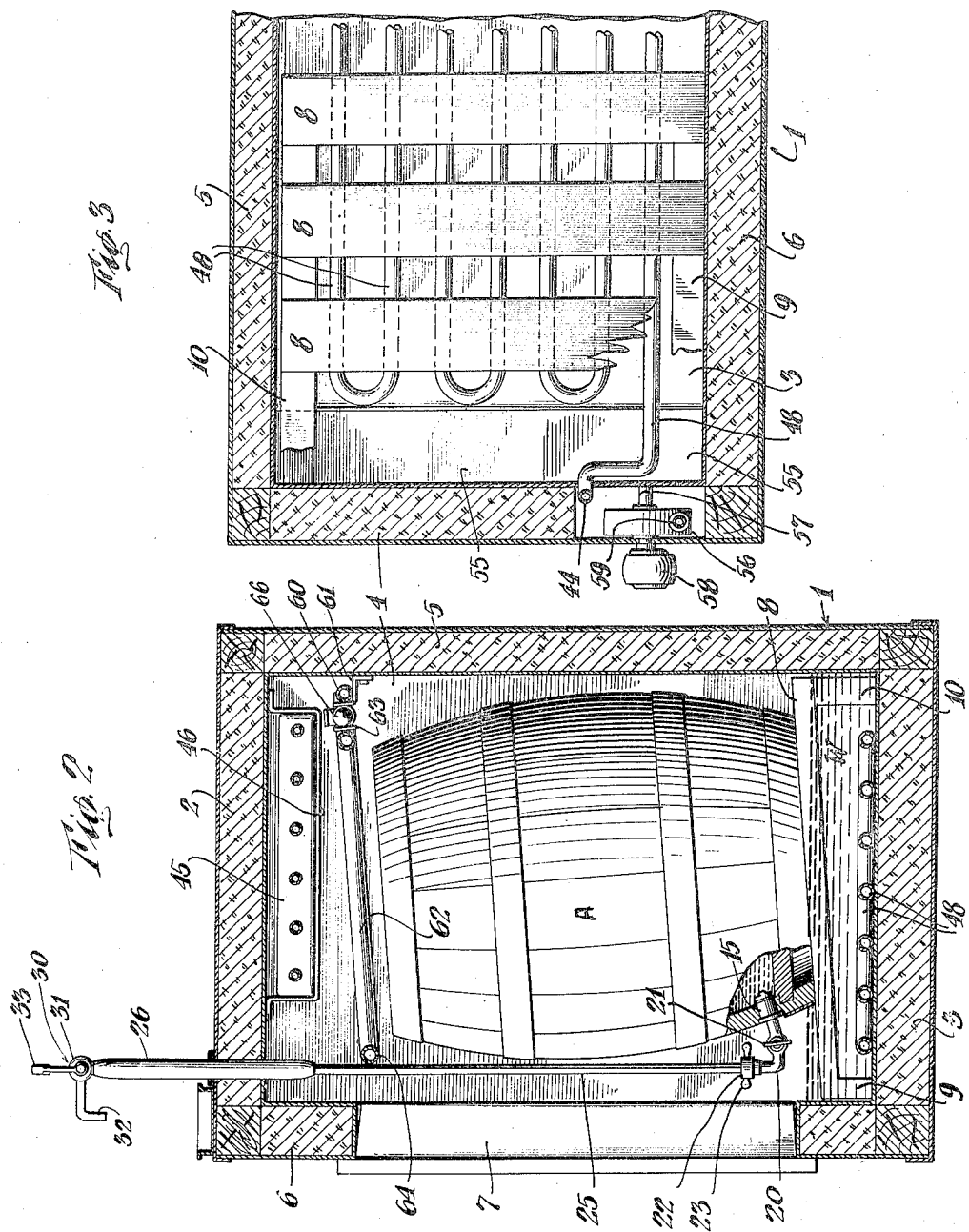

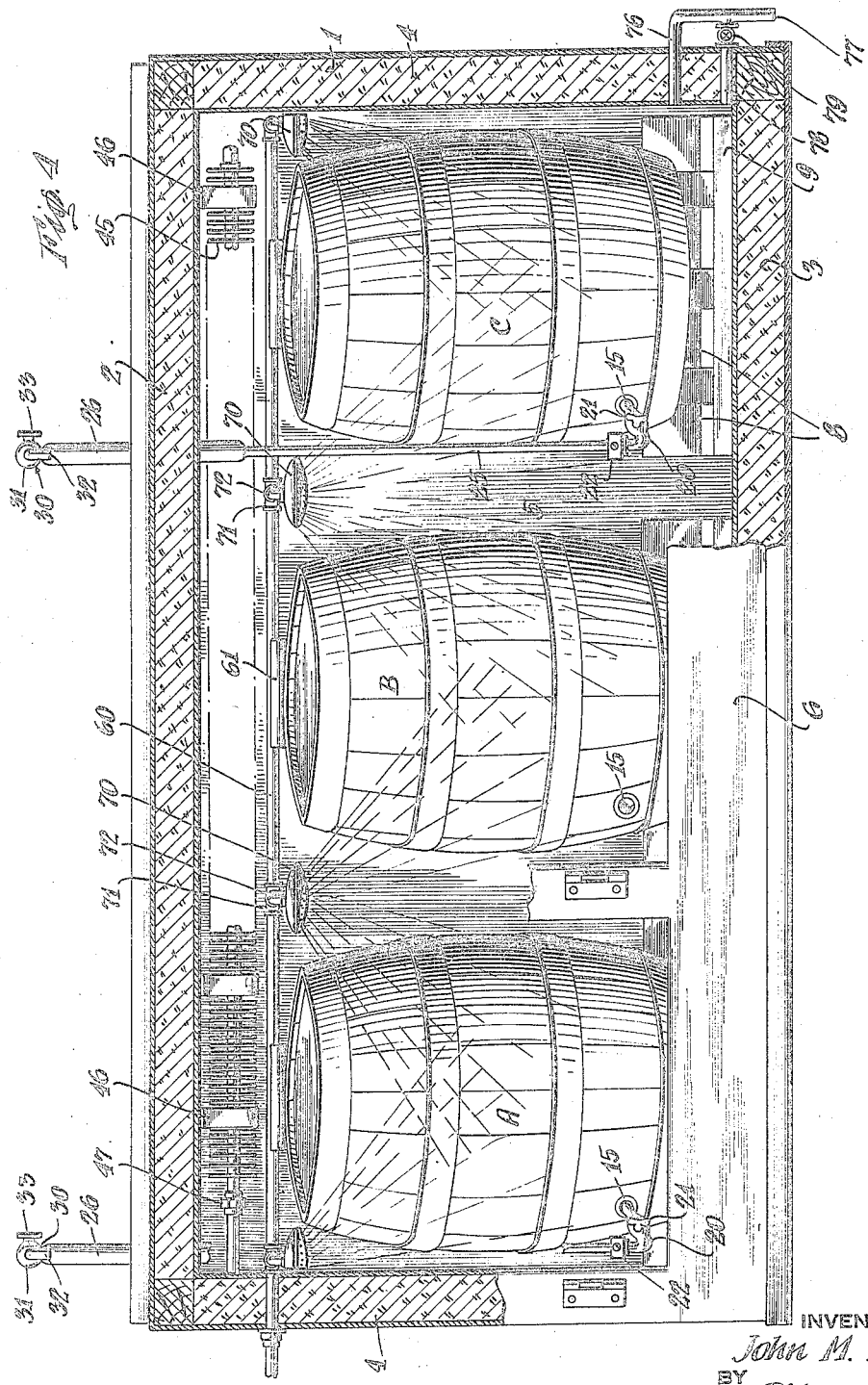

2,140,895

UNITED STATES PATENT OFFICE 2,140,895

METHOD AND APPARATUS FOR COOLING BREW

John M. Bruce, New York, N. Y.

Application October 17, 1936, Serial No. 106,091

15 Claims. (Cl. 62—141)

This invention relates to a method and apparatus for cooling brew, and more particularly to a method and apparatus for cooling beverages such as beer and ale to the proper potable consumption temperature.

Beverages such as beer, ale and other brews, are most potable and palatable to most individual consumers when held at a temperature of 41° to 45° Fahrenheit. These brews should be kept at approximately this temperature or slightly below this temperature from the time they are manufactured until they are consumed, if they are to possess their most palatable qualities. Warming and thereafter quick chilling of the brew gives the brew a cloudy appearance and an uninviting taste. Brewers have long realized the importance of maintaining the brew closely approximating the above temperatures from the time it leaves the brewery until it is delivered to the retailer, where the brewer loses control and supervision over his product. The warming of the brew and thereafter a quick chilling thereof by the retailer removes much of the palatable qualities of the brew and often the customer complains and the brewer loses prestige and, consequently, business as a result of the improper care of the brew by the retailer. Many brewers provide refrigerated trucks when the brew is to be hauled a long distance, to insure that when the brew reaches the retail outlet it will possess the proper and most palatable temperature. Where the brew is to be conveyed in trucks on short hauls only, an open truck is sometimes used, which is covered with a canvas or protective screen. Brew preferably leaves the brewer's at a temperature of approximately 38°, so that some allowance is made for a rise in temperature of from one to two degrees an hour during transportation in unrefrigerated trucks. The reliable brewer takes pride in his product and the good will which it represents, and as a general rule attempts to deliver the brew to the retail outlet at approximately the correct potable temperature.

Difficulties arise, however, in the handling of the brew after it leaves the brewer's trucks and is placed in the hands of the retail merchant. This invention is directed particularly to the preservation of the brew within a definite temperature range after it reaches the retail merchant and until delivered to the customer from the tap.

In accordance with my invention, I provide a refrigerating cabinet adapted to contain one or more brewers' barrels in which the brewer transports the brew to the retail merchant. The refrigerating cabinet may be constructed to fit neatly under the bar, in which case the barrels are arranged within the cabinet in a row. It is understood, however, that the cabinet may be constructed to properly house any desired arrangement of the brew barrels or containers. The cabinet is provided with refrigerating mechanism therein, which cools and maintains the brew in the barrels at the proper potable temperature.

Brewers' barrels when made of insulated metal or of wood in particular do not readily permit the passage of heat or cold therefrom or therethrough when kept in a dry condition. Experiments which I have conducted have shown, however, that if the barrels are sprayed with a cold liquid, such as cold brine, or water-containing glycerin, or other non-freezing compound which permits the water to be kept in liquid flowing condition when held at or below freezing temperatures, the temperature of the brew can be gradually brought down to the proper potable temperature at an efficient, satisfactory and economical speed and at the same time avoid the cloudiness and uninviting taste which results from quick chilling. The brew is thus cooled and maintained at the proper potable temperature until drawn from the tap. The spray devices may be formed either of spray hoops, spray nozzles, or spray heads, or other devices operative to place a film of cooling liquid over the sides of the barrel. The cooling liquid collects in a suitable receptacle at the bottom of the cabinet and, if desired, the barrels may be so supported that the lower ends of the barrels stand in the cooling liquid. A circulating system including a suitable pump draws the cooling liquid from the bottom of the cabinet and forces it through a suitable conduit to the spray apparatus, which continuously sprays the cooling liquid over the sides of the barrel. Thus a continuous circulating cooling system is provided. Automatic pressure or temperature responsive devices may be provided to halt or throw into operation the cooling mechanism which cools the cooling liquid. Automatic, semi-automatic or manual means may be provided to halt or throw into operation the circulating spray system, either when the brew has been cooled to the proper temperature or when the temperature rises to the point where further cooling is required.

My improved cooling system insures that the brew drawn from the tap either frequently or infrequently will possess the desired potable temperature, and further insures the preservation of the brew in the best possible condition from the time of delivery to the retail merchant until drawn from the tap for customer consumption. The deteriorating effects of rapid warming and quick chilling which gives the brew a cloudy appearance and flat taste is thus avoided.

The cabinet may be provided with an inclined barrel support so arranged and constructed as to permit the easy insertion and removal of the barrels and further permits extraction of all the brew from the barrel. Preferably the cabinet is of generally cubical form to house a row of brew barrels. The cabinet can be economically constructed to occupy only the waste space under the bar. Since the barrels and cooling unit are completely enclosed the retail merchant's premises can be kept neat and tidy and attractive in appearance. Leakage of the brew around the dispensing bar which produces an unsanitary condition and unpleasant odor is thus avoided. The brewer as well as the retailer and his customers are assured of a high quality brew dispensed under the most sanitary conditions and at low cost.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a vertical longitudinal cross-sectional view through the refrigerating cabinet, showing three brew barrels installed therein, this view also showing the refrigerating and cooling apparatus associated with the cabinet;

Fig. 2 is a transverse cross-sectional view through the cooling cabinet and associated refrigerating and cooling apparatus, this view being taken along line 2—2 of Fig. 1;

Fig. 3 is a fragmentary horizontal cross-sectional view through the refrigerating cabinet, showing certain details of the liquid cooling system arranged at the bottom of the cabinet, this view being taken on line 3—3 of Fig. 1; and Fig. 4 is a longitudinal cross-sectional view of my cooling cabinet with associated refrigerating apparatus, this view showing somewhat modified apparatus for spraying the cooling liquid over the sides of the brew barrels.

Similar reference characters refer to similar parts throughout the several views of the drawings and specification.

Referring more particularly to Figs. 1, 2 and 3, I have shown for purposes of illustration, a refrigerating cabinet 1 of generally rectangular box-like form having positioned therein three brew barrels A, B and C. Fig. 1 shows brew-dispensing apparatus connected to the brew barrel A, comprising a barrel plug 15, an elbow connection 20 which conducts the brew into a substantially straight dispensing conduit 25, and a dispensing faucet 30 positioned outside of the cabinet and connected to the conduit 25. As illustrated, the brew is shown in the process of being withdrawn from the barrel A. Barrel B is undergoing further cooling under the liquid spray device but has connected thereto a barrel plug 15 and an elbow connection 20 to which the dispensing conduit 25 and associated faucet 30 may be attached when the brew is to be withdrawn therefrom. Barrel C is shown undergoing cooling and is provided only with a barrel plug 15 which forms a permanent part of the barrel. The cooling liquid w preferably stands in a pool at the bottom of the cabinet, where it is kept at the proper cooling temperature by a series of cooling coils 48, as shown more particularly in Figs. 1 and 3. The cooling liquid is drawn out by the pump 56 and conducted to the spray hoops 62 mounted over each of the barrels, the spray hoops operating to deposit a film of cooling liquid over the barrel side walls. If further cooling means, other than the cooling liquid at the bottom of the cabinet, is needed to cool the cabinet interior, refrigerating coils 45 may be provided, which coils may be mounted at the top of the cabinet as shown in Figs. 1 and 2. Coils 45 may be connected to a suitable refrigerating machine 40.

The refrigerating cabinet generally comprises a top wall 2, a bottom wall 3, end walls 4, a rear wall 5, and a front wall 6. The front wall 6 is provided with a door opening for each brew barrel, each door opening being closed by a suitably insulated door 7 hinged to swing outwardly. The cabinet should be sturdily constructed and well insulated to prevent the entrance heat and retain the interior of the cabinet at the proper brew-cooling temperature. The cabinet is preferably so constructed that it will, if desired, fit neatly beneath the bar from which the retail merchant dispenses the brew to the customer. A suitable supporting rack or racks are provided at the bottom of the cabinet to support the brew barrels in an inclined position to permit complete drainage of the brew from the barrels. As shown in Figs. 1 and 2, I provide a separate rack for each barrel, comprising a series of transversely extending inclined slats 8 upon which the barrel rests, the slats 8 being supported from the floor 3 of the cabinet by longitudinally extending frame members 9 and 10. Preferably the support members 9 and 10 are so arranged that the barrel-supporting slats 8 will incline forwardly in the direction of the cabinet door 7. The barrels A, B and C are the brewers' barrels in which the brew is placed after manufacture and thereafter transported. These barrels are of well known construction and are generally formed either of wood or metal.

Each barrel is equipped with a discharge plug 15 which forms a permanent part of the barrel. The discharge plug 15 is provided with a shut-off valve which permits the plug to be closed until the elbow connection 20 is attached thereto, after the barrel has been installed within the refrigerating cabinet. The elbow connection 20 is provided with a shut-off cock 21 which halts the flow of brew therethrough until desired. The dispensing conduit 25 is substantially straight and extends from the elbow connection 20 up through the top wall 2 of the cabinet. The lower end of the conduit 25 is detachably attached to the elbow connection 20 by means of a suitable collar member 22 which may be manipulated by the handles 23 to provide a non-leak fitting between the elbow connection 20 and the conduit 25. That portion of the conduit 25 within the cabinet is kept at the proper brew temperature by the cold atmosphere within the refrigerator. Preferably the upper portion of the conduit 25 which extends through the top wall 2 of the cabinet is encased in a suitable insulated casing 26. A suitable faucet 30 comprising a valve element 31, a discharge spout 32, and a valve-manipulating handle 33, is connected to the upper end of the conduit 25. The particular construction of the barrel plug 15, the elbow connection 20, the dispensing conduit 25, and the faucet 30, is more particularly described in my co-pending application Serial No. 106,089 filed concurrently herewith. It will here be noted, however, that the brew-withdrawal passages formed in the elbow connection 20, the conduit 25, and the tap 30, are preferably of substantially the same diameter throughout, which diameter preferably does not substantially exceed ⅛th to ⁵⁄₁₆ths of an inch and therefore possesses a low brew-containing capacity, so that substantially all of the brew, whether withdrawn frequently or infrequently, remains in the barrel immediately prior to withdrawal. It will be further noted that this dispensing mechanism is free from sharp bends or angles, thus avoiding excessive agitation of the brew as it is withdrawn. My dispensing mechanism is furthermore so constructed that it permits of quick cleaning and sterilization of the dispensing apparatus irrespective of the quantity of brew in the barrel.

The cabinet 1 is refrigerated by means of any suitable refrigerating mechanism. For the purposes of illustration only, I have shown diagrammatically in Fig. 1 a refrigerating machine 40 provided with a suitable compressor 41 driven by a motor 42. A suitable refrigerant gas is supplied to the machine 40 and the compressor 41 operates to condense the gas into a substantially liquid condition. The refrigerant, which has been condensed to substantially liquid form, passes into the conduit 43 connected to the supply pipe 44 positioned within an end wall 4 of the cabinet. The conduit 44 leads to the fin cooling coils 45 suspended from the top wall 2 of the cabinet by means of the brackets 46. A suitable coupling 47 may be provided to permit attachment and detachment of the refrigerating coils 45. The refrigerating coils 45 may be of any well known construction designed to properly cool and refrigerate the cabinet.

The lower end of the conduit 44, as shown more particularly in Figs. 1 and 3, is connected to a serpentine cooling coil 48 positioned along the bottom 3 of the cabinet. The serpentine or loop coil 48 is designed to receive the refrigerant to cool and re-cool the liquid $w$ which floods the bottom of the cabinet and drips over the barrels after it has been sprayed over the sides of the barrels by means of apparatus hereinafter described. It is understood that my invention is not limited to any particular type of refrigerating coil, but any well-known type of refrigerating mechanism including associated refrigerating fins and coils, may be used. The spiral coils 48 are designed to maintain the cooling liquid sprayed over the barrels at the proper temperature. The cooling liquid circulating over the barrels or brewers' container also serves to cool the interior of the insulated cabinet, but if the cooling thus effected is not sufficient to cool and maintain the interior of the cabinet at the required temperature, refrigerating coils 45 may also be provided to further reduce the cabinet interior to and maintain it at the desired temperature. Suitable control devices may be associated with the refrigerating machine to throw the refrigerating mechanism into operation until such time as the interior of the cabinet has been reduced to the proper cooling temperature, at which point the control mechanism may operate to halt the operation of the refrigerating mechanism.

The cooling liquid $w$ which floods the bottom of the cabinet may comprise cold water. If it is found desirable to reduce the temperature of the cooling liquid below the freezing point of water, salt water or brine may be used or, if desired, glycerine or other anti-freeze material may be mixed with the water or, if desired, any other suitable anti-freeze liquid may be used. The cooling liquid $w$ may be admitted into the bottom of the cabinet through a suitable supply pipe 50 connected to a valve 51 leading into the interior of the cabinet. A suitable turn-off float 52 may be provided to turn off the flow of the liquid into the cabinet, when it reaches the desired level. The cooling liquid preferably is of sufficient depth to cover fully the cooling coil 48 and also, if desired, may be of sufficient depth to flood the bottom end of the barrel, as illustrated in Fig. 2. It is understood, however, that it is not absolutely necessary to flood the bottom of the barrel, which rests upon the rack bars 8. The cooling liquid $w$, cooled by the coil 48, flows into a suitable sump 55 at one end of the cabinet, where it is drawn off by a suitable pump 56 through the pipe connection 57.

The pump 56, as illustrated in Figs. 1 and 3, may be of the rotary type or other suitable type and may be driven by a suitable motor 58. The pump 56 lifts the cooling liquid $w$ up through the conduit 59, which may be either positioned within the cabinet or embedded in the end wall 4 of the cabinet. The upper end of the conduit 59 is connected to a horizontally extending feed-pipe 60 which may be supported on suitable brackets 61 fixed to the rear wall 5 of the cabinet. The feed-pipe 60 is connected to one or more spray hoops 62 which are positioned respectively over the top of each barrel. A suitable conduit connection 63 connects the feed pipe 60 to the hoop spray 62, so that the cooling liquid $w$ constantly flows into the hoop sprays 62. The hoop sprays 62 are provided with a series of spray openings 64 around the bottom thereof, as shown more particularly in Fig. 2. The hoop spray 62 is of such size and is so arranged as to project a downpour of the cooling liquid $w$ against the sides of the barrels. The cooling liquid $w$ trickles down over the body of the barrel and drips from the bottom of the barrel back into the pool of cooling liquid at the bottom of the cabinet. Thus a film of cooling liquid substantially completely encases the barrel.

Extensive experimental tests conducted in this method of cooling reveals that the temperature of the brew within an oak barrel can be reduced from 1 to 5 degrees an hour in temperature, depending upon the temperature of the brew therein. The brew generally leaves the brewery at a temperature of approximately 38° F., which is several degrees below the usual potable temperature of approximately 42°. If the brew-filled barrel is transported by the brewer in a refrigerated truck or subjected to a short haul only, the brew in the barrel should not be appreciably above the 42-degree temperature point if the barrel is promptly deposited in the refrigerating cabinet. Under such circumstances no appreciable reduction in temperature of the brew is necessary and all that is required is to maintain the temperature of the brew within the barrel at the desired potable temperature of, say, approximately 42°. If the temperature of the brew within the barrel positioned within the cabinet has risen appreciably, the refrigerating fin coils 45 and the cooling liquid $w$ sprayed over the sides of the barrel will exert sufficient cooling influence on the brew to bring it down to this desired potable temperature within one or two hours. My improved apparatus, however, is so designed as to effect proper cooling of the brew within the barrel which has a temperature as high as 60° F. or above, from which upper ranges the temperature of the brew can be brought down at the rate of five or more degrees per hour.

Barrels made of wood, such as oak, or metal-insulated barrels are, when dry, normally resistant to the passage of heat or cold therethrough, which is a desirable feature during the transportation of the brew-filled barrels from the brewery to the retail merchant. These barrels have a high insulating efficiency when the barrels are kept substantially dry. It has been discovered, however, that when cooling liquid is sprayed over the outer surfaces of the barrels, whether they be made of wood or metal with insulation, the insulating efficiency of the same is greatly reduced so that the brew in the barrels can be relatively quickly reduced to the desired potable temperature from the cold and moisture-filled air which surrounds the barrel in the cabinet. Preferably the temperature of the cabinet is somewhat under 42° F., but it is understood that the temperature range within the barrel may well vary within wide limits and may be flexibly controlled by suitable temperature controls so as to bring the temperature down to the proper point and at the proper speed. The spray hoops 62 may be disconnected from the feed-pipe 60 by means of a suitable valve 66 so that spray hoops need not be operated if there is no brew in the barrel to be cooled or when the brew in the barrel has already reached the desired temperature. The valve 66 may be operated manually, electrically, or in any other suitable manner convenient to the user. In event the float valve 52 fails to operate, a flood pipe 76, shown in Figs. 1 and 4, may be provided, which conducts the overflow into the drain pipe 77. A suitable drain 78 connected to the drain pipe 77 and having a suitable shut-off valve 79 is provided by which the liquid from the cabinet may be drained out.

The spray hoops 62 not only serve to cool the brew in the barrel but also serve to keep the barrel moist while in use. Brewers' barrels, and particularly wooden barrels which are most commonly used, leak and become useless if the wooden staves forming the barrel are permitted to become dry, causing shrinkage and a loosening of the hoops. The liquid spray which covers the sides of the barrel keeps the barrel in excellent leakproof condition, thus considerably reducing cooperage costs to the brewer and the annoyance and loss resulting from leaky barrels.

In place of the hoop sprays 62 as shown in Fig. 1, I also contemplate as a substitute, spray nozzles or spray heads 70, as shown more particularly in Fig. 4, which are arranged to spray the sides of the barrel with the cooling liquid. The spray heads 70 may be suitably connected with the feed-pipe 60 by a suitable connection 71 which, if desired, may be provided with a shut-off valve 72 either manually, mechanically, or electrically operated. A sufficient number of spray heads 70 are provided to substantially fully cover the sides of the barrel with a film of cooling liquid, which is permitted to trickle down the sides of the barrel and drop into the liquid pool at the bottom of the cabinet. Any desired number of spray nozzles or spray heads 70 may be provided to accomplish the desired cooling result.

Further increased efficiency in cooling may be accomplished by providing a fan 80, such as shown in Fig. 1, positioned within the cabinet. The fan 80, driven by a suitable motor 81, is arranged to cause circulation of the moist, cold air within the cabinet, thus further increasing the cooling efficiency.

In the majority of cases the brewer delivers the brew to the retail merchant at approximately the proper potable temperature, in which event the maintenance of the brew at the proper temperature is all that is required. In such event it may be found unnecessary to use the fin refrigerating coils 45 since exceedingly efficient and economical cooling may be effected by the spray devices above described.

With my improved method of cooling herein set forth, the brew is not quickly chilled as in present cooling arrangements which give the brew a cloudy appearance and an uninviting taste. The cooling takes place without agitation of the brew as in present cooling and dispensing devices. Agitation of the brew destroys its palatable flavor and quality. My improved method and apparatus is sufficiently flexible to maintain the brew-containing barrels deposited in the refrigerator at the proper brew dispensing temperature of, say, approximately 42°, or will efficiently and economically gradually reduce the temperature of the beer in the barrel which may have risen to a temperature of 60° F. or higher. This gradual cooling preserves to the utmost the quality and flavor of the brew and avoids the quick cooling and chilling with consequent loss of flavor which accompanies present cooling processes. It is understood that various controlling devices well known to the art may be provided for controlling and regulating the temperature within the cabinet as well as the temperature of the brew within the barrels, the temperature of the refrigerant flowing through the coils 48 and the temperature of the cooling liquid $w$.

While certain novel features of the invention have been disclosed and are pointed out in the annexed claims, it will be understood that various omissions, substitutions and changes may be made by those skilled in the art without departing from the spirit of the invention.

What is claimed is:

1. Apparatus for use in dispensing brew from a brewers' transportation barrel including, a cabinet adapted to accommodate a brewers' barrel therein, said cabinet having insulated front, rear and top and bottom enclosing walls, a door-opening in one of said walls through which a brewers' barrel may be inserted into and removed from the cabinet, an insulated door for said opening, a refrigerating coil, means for holding a supply of cooling liquid in heat exchange relation with said coil, means for supplying a refrigerant to said coil, and means in said cabinet for projecting a stream of such cooling liquid over substantially the entire exterior side wall area of a brewers' barrel positioned in the cabinet and under the liquid projecting means to maintain the brew within the barrel at potable temperatures.

2. Apparatus for cooling brew in a brew dispensary which includes, an insulated cabinet, a brewers' transportation container, means in said cabinet for supporting a brewers' container in substantially upright position, a spray device for projecting a stream of cooling liquid downwardly over the side wall of a brewers' container positioned in said cabinet, a receptacle at the bottom of the cabinet for collecting liquid which drips from the exterior of the container, means for cooling said liquid, and means for circulating the cooling liquid from said receptacle to said spray device.

3. Apparatus for use in dispensing brew from a brewers' transportation container including in combination, an insulated cabinet, means in said cabinet for supporting in substantially upright position a brewers' transportation container in said cabinet, a spray device for forming a film of cooling liquid moving downwardly over and surrounding an appreciable portion of the exterior of such brewers' transportation container in said cabinet to cool and maintain the brew within the container at a potable temperature, and means for supplying cooling liquid to said spray device.

4. Apparatus for use in dispensing brew from a brewers' transportation container including in combination, a heat-insulated cabinet, means in said cabinet for supporting in substantially upright position a brewers' transportation container, a spray device for forming a film of cooling liquid moving downwardly over substantially the entire exterior side wall area of said container to cool and maintain the brew within the container at a potable temperature, means for retaining a pool of said cooling liquid within the bottom of the cabinet, and means for conveying the cooling liquid from said pool to said spray device.

5. Apparatus for use in dispensing brew from a brewers' transportation container including, an insulated cabinet, means in said cabinet for supporting in substantially upright position a brewers' transportation container, a spray device positioned adjacent the top end of such container for forming a film of cooling liquid moving downwardly over the side wall of such container in said cabinet to cool and maintain the brew therein at a potable temperature, a liquid cooling coil adjacent the bottom of said cabinet, and means for supplying cooling liquid to said spray device.

6. Apparatus for cooling brew in a brew dispensary including, an insulated cabinet adapted to accommodate one or more brewers' transportation containers, a spray device positioned adjacent the top of the cabinet for projecting a spray of cooling liquid downwardly over the side wall of one of such brewers' transportation containers positioned within said cabinet to cool and maintain the brew therein at a potable temperature, a receptacle at the bottom of said cabinet adapted to contain a pool of said cooling liquid, a refrigerating coil within said receptacle, and means for conducting cooling liquid from said pool to said spray device.

7. Apparatus for cooling brew in a brewers' transportation container including in combination, an insulated cabinet, means in said cabinet for supporting a brewers' transportation container in substantially upright position in said cabinet, a spray device positioned adjacent the top wall of the cabinet for projecting a spray of cooling liquid downwardly over the side wall of a brewers' container in said cabinet to cool and maintain the brew therein at a potable temperature, a liquid cooling device within said cabinet, means for supplying a refrigerant to said liquid cooling device, means below said container support for collecting the liquid dripping from the container, and means for returning said liquid to said spray device.

8. Apparatus for cooling brew including in combination, an insulated cabinet, means for supporting in substantially upright position a brewers' barrel therein, refrigerating coils mounted within said cabinet adjacent the bottom of said barrel support, a refrigerating machine adapted to supply a refrigerant to said coils, means for projecting a stream of cooling liquid over the exterior of such barrel to facilitate cooling of the brew within said barrel, and means for circulating the liquid into cooling contact with said coils.

9. Apparatus for dispensing brew from a brewers' transportation barrel including in combination, an insulated cabinet adapted to accommodate a brewers' barrel therein, a refrigerating coil positioned within said cabinet adjacent the bottom wall thereof, means for retaining a pool of cooling liquid in heat exchange contact with said refrigerating coil adjacent the bottom of the cabinet, a spray device positioned adjacent the top wall of said cabinet for projecting a spray of cooling liquid over the side wall of such barrel positioned within said cabinet to cool the brew within the barrel, and means for conveying cooling liquid from said pool to said spray device.

10. Apparatus for dispensing brew from a brewers' transportation barrel including in combination, an insulated cabinet adapted to accommodate a brewers' barrel therein, a hoop-shaped spray device positioned to project a spray of cooling liquid downwardly over the sides of a barrel in said cabinet, a receptacle adjacent the bottom of said barrel for collecting the cooling liquid, and means for circulating the cooling liquid from said receptacle to said spray device.

11. Apparatus for use in dispensing brew from a brewers' transportation barrel including in combination, an insulated cabinet adapted to accommodate a brewers' barrel therein, a refrigerating coil positioned within said cabinet adjacent the bottom wall thereof, a receptacle at the bottom of the cabinet for containing a pool of cooling liquid in surrounding contact with said cooling coil, means for supplying a refrigerant to said cooling coil, a spray device positioned to apply a moving film of cooling liquid over the side wall of a brewers' barrel positioned in said cabinet, a conduit extending from said pool to said spray device, and means for elevating said cooling liquid from said pool through said conduit and to said spray device.

12. A method of cooling brew contained within a brewers' transportation container which includes, so projecting a cooling liquid against such container as to form a moving film surrounding a substantial portion thereof to bring down the temperature of the brew within the container and maintain the brew within the container at the desired potable temperature, collecting the cooling liquid dripping from said container, re-cooling said cooling liquid, and again projecting said re-cooled liquid over the side wall of said container.

13. The method of cooling brew in a brewers' transportation container to cool the brew therein and maintain said brew within a predetermined dispensing temperature range when the container is set up in dispensing position which includes, chilling the brew by showering chilled cooling liquid so as to form a film of said cooling liquid moving over the outside of the container, maintaining the cooling liquid moving in contact with the container walls at 40° F. or below, and controlling the showering of said cooling liquid over the container.

14. A method of cooling brew in a brewers' transportation barrel to cool the brew therein and maintain said brew within a predetermined dispensing temperature which includes, chilling the brew by circulating a film of cooling liquid over the side walls of the barrel to facilitate and hasten the heat transfer through the barrel walls and thus bring down the temperature of the brew within the barrel and maintain the brew within the barrel at a potable temperature, collecting the cooling liquid dripping from said barrel, re-cooling said cooling liquid, and replenishing said film with said re-cooled liquid.

15. Apparatus for use in dispensing brew from a brewers' transportation barrel including, means for supporting a brewers' barrel in substantially upright position, a spray hoop having an internal diameter slightly greater than the head of the barrel to be cooled, means for supporting said spray hoop adjacent the top head of a brewers' barrel positioned therebeneath, refrigerating means for cooling a cooling liquid, and means for supplying said cooling liquid to said spray hoop.

JOHN M. BRUCE.